US009602568B2

(12) United States Patent
Mamidwar et al.

(10) Patent No.: US 9,602,568 B2
(45) Date of Patent: *Mar. 21, 2017

(54) ADAPTIVE AUDIO VIDEO (AV) STREAM PROCESSING

(71) Applicant: BROADCOM CORPORATION, Irvine, CA (US)

(72) Inventors: Rajesh Shankarrao Mamidwar, San Diego, CA (US); Sanjeev Sood, San Diego, CA (US); Anand Tongle, San Diego, CA (US); David Wu, San Diego, CA (US); Prashant Katre, San Diego, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,816

(22) Filed: Aug. 10, 2015

(65) Prior Publication Data
US 2015/0350285 A1 Dec. 3, 2015

Related U.S. Application Data

(62) Division of application No. 14/091,280, filed on Nov. 26, 2013, now Pat. No. 9,137,285.
(Continued)

(51) Int. Cl.
G06F 15/16 (2006.01)
H04L 29/06 (2006.01)
(Continued)

(52) U.S. Cl.
CPC .......... *H04L 65/604* (2013.01); *H04L 49/206* (2013.01); *H04L 49/35* (2013.01);
(Continued)

(58) Field of Classification Search
CPC ............. H04L 49/9036; H04L 49/9047; H04L 2012/5678; H04L 2012/5681; H04L 2012/6489
(Continued)

(56) References Cited

U.S. PATENT DOCUMENTS 5,694,404 A 12/1997 Huang
5,754,789 A * 5/1998 Nowatzyk ......... G06F 15/17381
709/233
(Continued)

Primary Examiner — Michael Y Won
(74) Attorney, Agent, or Firm — McDermott Will & Emery LLP

(57) ABSTRACT

A system for adaptive audio video (AV) stream processing may include at least one processor and a switch device. The switch device may be configured to route AV traffic to the processor, and to receive AV traffic from the processor and provide the AV traffic to a client device via one or more channels. The processor may monitor a transcoder buffer depth and depths of buffers associated with channels over which the AV traffic is being transmitted. The processor may adaptively modify one or more attributes associated with the AV traffic based at least on the monitored buffer depths. For example, the processor may adaptively adjust a bit rate associated with transcoding the AV traffic based at least on the transcoder buffer depth. The processor may utilize the depths of the buffers associated with the channels to adaptively adjust the amount of AV traffic provided for transmission over the channels.

20 Claims, 5 Drawing Sheets

Related U.S. Application Data

(60) Provisional application No. 61/893,829, filed on Oct. 21, 2013.

(51) Int. Cl.

| | | |
|---|---|---|
| *H04L 29/08* | (2006.01) | |
| *H04L 12/931* | (2013.01) | |
| *H04L 12/70* | (2013.01) | |
| *H04L 12/933* | (2013.01) | |
| *H04L 12/861* | (2013.01) | |
| *H04L 1/18* | (2006.01) | |
| *H04L 12/883* | (2013.01) | |
| *H04L 12/64* | (2006.01) | |
| *H04L 12/879* | (2013.01) | |

(52) U.S. Cl.
CPC ............ *H04L 65/607* (2013.01); *H04L 67/32* (2013.01); *H04L 1/1874* (2013.01); *H04L 49/103* (2013.01); *H04L 49/9021* (2013.01); *H04L 49/9026* (2013.01); *H04L 49/9036* (2013.01); *H04L 49/9047* (2013.01); *H04L 2012/5678* (2013.01); *H04L 2012/5681* (2013.01); *H04L 2012/6489* (2013.01)

(58) Field of Classification Search
USPC ....... 709/202, 203, 217, 221, 226, 228, 231, 709/232, 236, 246, 247
See application file for complete search history.

(56) References Cited

U.S. PATENT DOCUMENTS

| | | | | |
|---|---|---|---|---|
| 6,044,396 | A * | 3/2000 | Adams | H04H 20/42 348/386.1 |
| 6,188,699 | B1 * | 2/2001 | Lang | H04L 29/06 370/400 |
| 6,233,226 | B1 | 5/2001 | Gringeri et al. | |
| 7,106,799 | B1 | 9/2006 | Sostawa et al. | |
| 7,114,174 | B1 | 9/2006 | Brooks et al. | |
| 7,170,938 | B1 | 1/2007 | Cote et al. | |
| 7,230,917 | B1 * | 6/2007 | Fedorkow | H04L 47/10 370/229 |
| 7,433,365 | B1 * | 10/2008 | Burch | H04L 12/5601 370/437 |
| 7,953,002 | B2 * | 5/2011 | Opsasnick | H04L 47/10 370/230 |
| 8,218,439 | B2 | 7/2012 | Deshpande | |
| 2002/0052967 | A1 | 5/2002 | Goldhor et al. | |
| 2002/0131496 | A1 | 9/2002 | Vasudevan et al. | |
| 2002/0136298 | A1 | 9/2002 | Anantharamu et al. | |
| 2003/0014264 | A1 | 1/2003 | Fujii et al. | |
| 2003/0067877 | A1 | 4/2003 | Sivakumar et al. | |
| 2003/0095594 | A1 | 5/2003 | Laksono et al. | |
| 2004/0032827 | A1 * | 2/2004 | Hill | H04L 47/10 370/229 |
| 2004/0267956 | A1 | 12/2004 | Leon et al. | |
| 2005/0100100 | A1 | 5/2005 | Unger | |
| 2005/0152397 | A1 | 7/2005 | Bai et al. | |
| 2005/0232497 | A1 | 10/2005 | Yogeshwar et al. | |
| 2006/0227768 | A1 | 10/2006 | Sauber et al. | |
| 2006/0230406 | A1 * | 10/2006 | Smith | G06F 9/5033 718/105 |
| 2007/0053446 | A1 | 3/2007 | Spilo | |
| 2007/0169152 | A1 * | 7/2007 | Roodnick | H04L 1/0083 725/62 |
| 2007/0260782 | A1 * | 11/2007 | Shaikli | H04L 49/90 710/52 |
| 2008/0163288 | A1 | 7/2008 | Ghosal et al. | |
| 2008/0212690 | A1 | 9/2008 | Loukas | |
| 2009/0249405 | A1 | 10/2009 | Karaoguz et al. | |
| 2010/0091888 | A1 | 4/2010 | Nemiroff | |
| 2011/0082945 | A1 * | 4/2011 | Myers | H04N 21/234327 709/231 |
| 2011/0199899 | A1 * | 8/2011 | Lemaire | H04L 47/2416 370/230.1 |
| 2012/0314778 | A1 * | 12/2012 | Salustri | H04N 7/22 375/240.28 |
| 2013/0044801 | A1 | 2/2013 | Cote et al. | |
| 2013/0235887 | A1 * | 9/2013 | Mamidwar | H04L 41/0816 370/503 |
| 2013/0287212 | A1 * | 10/2013 | Marko | H04H 20/88 381/2 |
| 2013/0343450 | A1 | 12/2013 | Solka et al. | |
| 2014/0168362 | A1 | 6/2014 | Hannuksela et al. | |
| 2014/0281000 | A1 * | 9/2014 | Dattagupta | H04L 47/11 709/231 |
| 2014/0282790 | A1 * | 9/2014 | Stephens | H04N 21/44004 725/116 |
| 2015/0113158 | A1 | 4/2015 | Mamidwar et al. | |
| 2015/0180963 | A1 * | 6/2015 | Luecke | H04L 67/06 709/203 |

\* cited by examiner

ADAPTIVE AUDIO VIDEO (AV) STREAM PROCESSING

CROSS-REFERENCE TO RELATED APPLICATIONS

The present application is a divisional of U.S. patent application Ser. No. 14/091,280, entitled "Adaptive Audio Video (AV) Stream Processing," filed on Nov. 26, 2013, now issued as U.S. Pat. No. 9,137,285, which claims the benefit of U.S. Provisional Patent Application Ser. No. 61/893,829, entitled "Adaptive Audio Video (AV) Stream Processing," filed on Oct. 21, 2013, each of which is hereby incorporated by reference in its entirety for all purposes.

TECHNICAL FIELD

The present description relates generally to audio video (AV) stream processing, and more particularly, but not exclusively, to adaptive audio video (AV) stream processing.

BACKGROUND

Network devices, such as home gateway devices, may include a general purpose host processor, and/or other associated hardware components, for both processing audio video (AV) traffic, such as audio streams, video streams, etc., and for processing non-AV traffic. For example, the host processor may receive AV traffic, decrypt the AV traffic and/or add encryption to the AV traffic, and forward the AV traffic to a computing device operably connected to the gateway device, for example, via a local area network. In addition to performing these actions, the host processor may also process non-AV traffic that is transmitted over the local area network. Accordingly the host processor may negotiate multiple incoming and outgoing network connections, including determining whether traffic transmitted via each network connection should be encrypted or decrypted, encrypting and/or decrypting AV traffic, routing and/or responding to non-AV traffic, and tearing down each network connection when the network connection has been terminated. Furthermore, the host processor may process the traffic uniformly, e.g. in the same manner, irrespective of whether the traffic is AV traffic or non-AV traffic.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
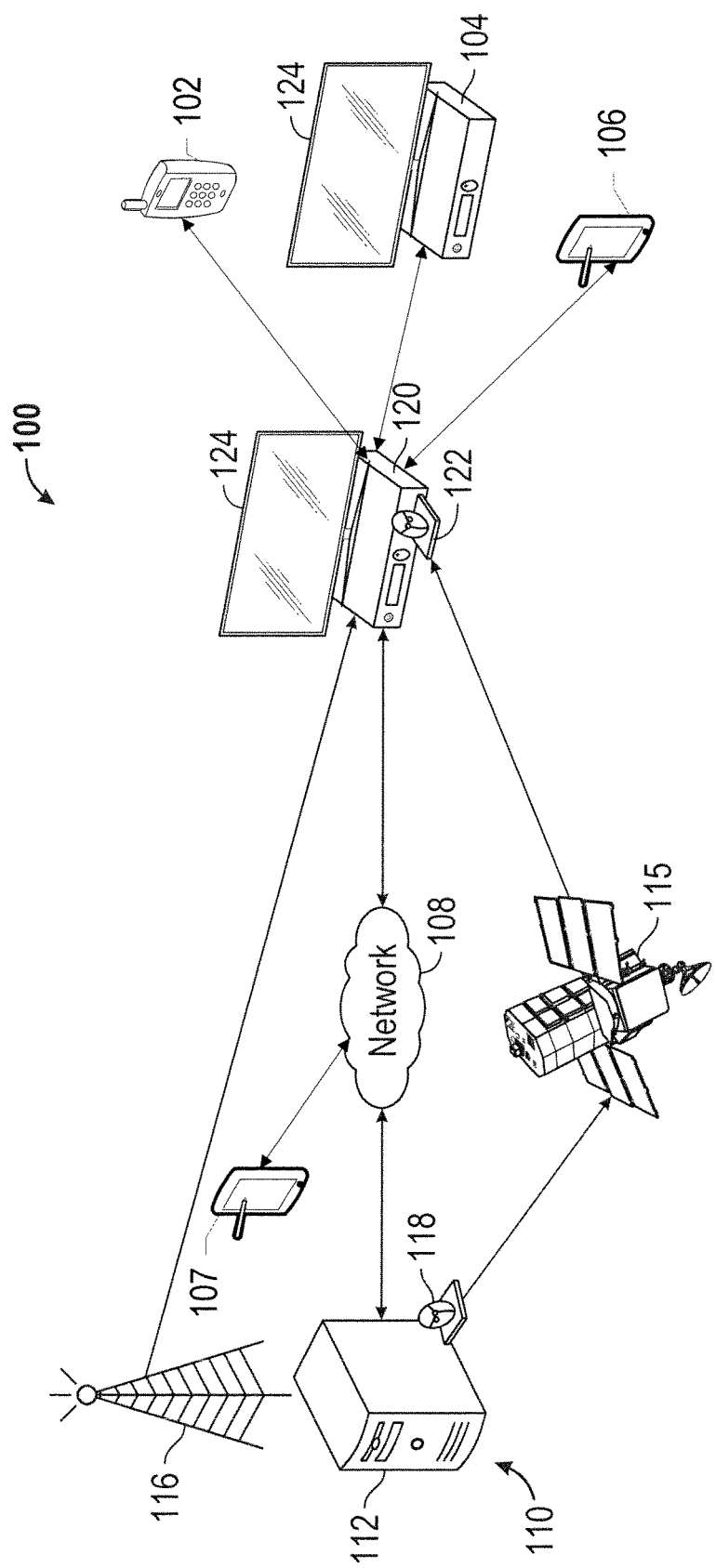
FIG. 1 illustrates an example network environment in which a system for adaptive AV stream processing may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for adaptive AV stream processing, a gateway device may include a dedicated processor along with associated hardware and/or firmware that exclusively processes AV traffic transmitted through the gateway device and a collocated switch device that routes AV traffic to, and receives AV traffic from, the dedicated processor. In one or more implementations, the dedicated processor and associated hardware and/or firmware may collectively be referred to as an AV stream processor, an advanced stream processor (ASP), and/or a stream processor. Accordingly, the AV stream processor of the gateway device may be specifically configured to process AV traffic, for example based on one or more attributes and/or characteristics of AV traffic, which may provide for more efficient processing and/or transmission of AV traffic than may be achievable by the host processor, and may thereby reduce the latency associated therewith. Furthermore, offloading the AV traffic processing tasks to the AV stream processor may reduce the processing load on the host processor of the gateway device.

For example, the AV stream processor may monitor the depth of a transcoder buffer associated with a collocated transcoder that is transcoding an AV stream for transmission. Based on the monitored buffer depth information, the AV stream processor may adaptively modify one or more attributes associated with the AV traffic. For example, the AV stream processor may adaptively modify a bit rate associated with transcoding the AV traffic, e.g. by the collocated transcoder, based at least on the monitored buffer depth information. Thus, the AV stream processor may be able to rapidly adapt the bit rate associated with the AV traffic, and therefore may be able to better compensate for rapidly fluctuating network conditions than, e.g., adaptive bit rate mechanisms that are only able to modify the bit rate at segment boundaries. The AV stream processor may also transmit AV traffic over multiple ports to a single client device, e.g. via channel bonding. Since the amount of bandwidth available over the ports may individually vary over time, the AV stream processor may monitor the depth of buffers associated with the ports to adaptively adjust the amount of AV traffic provided for transmission over the individual ports.

FIG. 1 illustrates an example network environment 100 in which a system for adaptive AV stream processing may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to a gateway device 120, such as by a network 108. In one or more implementations, the example network environment 100 may further include one or more electronic devices 102, 104, 106 that are communicably coupled to the gateway device 120, and an electronic device 107 that is communicably coupled to the gateway device 120 via the network 108. In one or more implementations, the gateway device 120 may be, or may also include, a set-top box, e.g. a device that is coupled to, and is capable of presenting AV programs on, an output device 124, such as a television, a monitor, speakers, or any device capable of presenting AV programs. In one or more implementations, the gateway device 120 may be integrated into the output device 124.

The CDN 110 may include, and/or may be communicably coupled to, a content server 112, an antenna 116 for transmitting AV streams, such as via multiplexed bitstreams, over the air, and a satellite transmitting device 118 that transmits AV streams, such as via multiplexed bitstreams to a satellite 115. The gateway device 120 may include, and/or may be coupled to, a satellite receiving device 122, such as a satellite dish, that receives data streams, such as multiplexed bitstreams, from the satellite 115. In one or more implementations, the gateway device 120 may further include an antenna for receiving data streams, such as multiplexed bitstreams over the air from the antenna 116 of the CDN 110. In one or more implementations, the content server 112 may transmit AV streams to the gateway device 120 over the coaxial transmission network. In one or more implementations, the gateway device 120 may receive internet protocol (IP) distributed AV streams via the network 108 and native moving picture experts group (MPEG) transport streams may be received via one or more of the antenna 116 and the satellite 115. The content server 112 and/or the gateway device 120, may be, or may include, one or more components of the electronic system discussed below with respect to FIG. 5.

In one or more implementations, any network data transmissions that include AV streams and/or AV data, and/or are associated with AV streams and/or AV data, such as acknowledgments for AV streams, may be referred to as AV traffic (or AV network traffic). Similarly, any network data transmissions that do not include, and/or are not associated with, AV streams and/or AV data, may be referred to as non-AV traffic (or non-AV network traffic). In one or more implementations an AV stream may refer to an audio stream and/or a video stream, individually or in combination.

The electronic devices 102, 104, 106, 107 can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for receiving, decoding, and presenting AV programs and/or can be coupled to such a device. In the example of FIG. 1, electronic device 102 is depicted as a smart phone, electronic device 104 is depicted as a set-top box, and electronic devices 106, 107 are depicted as tablet devices. In one or more implementations, any of electronic devices 102, 104, 106, 107 may be referred to as a user device or a client device. For example, the electronic device 104 and the gateway device 120 may both be set-top boxes and the electronic device 104 may operate as a client device of the gateway device 120.

The gateway device 120 may include, or may be coupled to, memory, a host processor for processing non-AV traffic, and a dedicated processor, along with associated hardware/firmware, that exclusively processes AV traffic, e.g. an AV stream processor. The gateway device 120 may also include a switch device that is configurable to route non-AV traffic to the host processor and AV traffic to the AV stream processor. In one or more implementations, the host processor, the AV stream processor, and/or the switch device may be co-located, e.g. on the same semiconductor chip and/or the same integrated circuit.

The switch device of the gateway device 120 may include egress queues, on a per egress-port basis, for buffering AV traffic received from the AV stream processor that is to be transmitted over one or more ports of the switch device to one or more of the electronic devices 102, 104, 106. The egress ports of the switch device may each be associated with a physical network interface, such as a coaxial network interface for multimedia over coax alliance (MoCA) connections, an Ethernet network interface for Ethernet connections, a wireless network interface for WiFi connections, reduced gigabit media independent interface (RGMII) for other network connections, etc.

The AV stream processor may include, and/or may be coupled to, buffers associated with each of the egress ports of the switch device. The buffers of the AV stream processor may buffer AV traffic that is to be transmitted to the switch device for transmission over the associated ports. In one or more implementations, the AV stream processor of the gateway device 120 may monitor the depths of the buffers associated with egress ports over which the AV traffic is to be transmitted, and may modify an attribute of the AV traffic based at least in on the depths of the buffers. In one or more implementations, the AV stream processor of the gateway device 120 may also monitor the depths of the egress queues associated with egress ports over which AV traffic is being transmitted, and may modify an attribute of the AV traffic based at least in on the depths of the egress queues and/or the depths of the buffers. An example gateway device 120 that includes a host processor, an AV stream processor, and a collocated switch device is discussed further below with respect to FIG. 2.

In the example network environment 100 of FIG. 1, the gateway device 120 is configured to couple the electronic devices 102, 104, 106 to the content server 112 and/or to the network 108, e.g. by using the aforementioned switch device. For example, the gateway device 120 may receive requests for AV traffic, e.g. AV streams, via the switch device, from the electronic devices 102, 104, 106 and may forward the requests, via the switch device, to the content server 112. In response to the requests, the gateway device 120 may receive, via the switch device, AV streams from the content server 112 and may forward the AV streams, via one or more ports the switch device, to one or more of the electronic devices 102, 104, 106. In one or more implementations, the gateway device 120 may transcode the AV streams before forwarding the AV streams to one or more of the electronic devices 102, 104, 106.

In one or more implementations, the gateway device 120 may receive and/or retrieve AV streams via one or more local AV sources, such as a local hard drive and/or one or more local AV tuners. For example, the electronic devices 102, 104, 106 may record AV programs on the local hard drive of the gateway device 120. The gateway device 120 may transcode, packetize, and/or otherwise process AV streams received/retrieved from local AV sources and may provide the packetized AV data to the electronic devices 102, 104, 106 for playback via the switch device.

In one or more implementations, the AV stream processor of the gateway device 120, or a transcoder communicatively coupled thereto, may transcode an AV stream before providing the AV stream to one of the electronic devices 102, 104, 106, such as the electronic device 104. In order to determine an appropriate bit rate for transcoding the AV stream, the AV stream processor may monitor the depth of a buffer associated with the transcoder. In one or more implementations, the AV stream processor may also monitor an egress queue associated with the port over which the AV stream is being transmitted to the electronic device 104. The AV stream processor may adaptively modify, over time, the bit rate at which the AV stream is being transcoded, based at least on the monitored buffer depth and, in one or more implementations, independent of segment boundaries, as is discussed further below with respect to FIG. 3. Thus, the AV stream processor can provide almost instantaneous adaptation to bandwidth fluctuations with respect to the transmission of the AV stream to the electronic device 104.

Furthermore, the AV stream processor may perform one or more functions associated with an adaptive bit rate (ABR) streaming server, such as determining segment boundaries for the AV stream, determining different profiles for the AV stream, generating a manifest for advertising the different profiles for the AV stream, etc. The AV stream processor may also perform one or more functions associated with an adaptive bit rate (ABR) streaming client, e.g. in instances where the gateway device 120 is receiving AV streams via ABR streaming from the content server 112 and providing AV streams via ABR streaming to the electronic devices 102, 104, 106. For example, the AV stream processor may determine when to select a different profile of an AV stream being received via ABR streaming from the content server 112.

In one or more implementations, the AV stream processor of the gateway device 120 may transmit the AV traffic to one of the electronic devices 102, 104, 106, such as the electronic device 104, at least partially contemporaneously over two channels, e.g. via a first port associated with a first physical network interface, such as an Ethernet interface, and via a second port associated with a second physical network interface, such as a coaxial interface, a cellular interface, a Wi-Fi interface, and the like. The at least partially contemporaneous transmission of AV traffic over two different channels may be referred to as channel bonding. Since the channels may have different bandwidth characteristics, the amount of AV traffic that can be transmitted over each channel may differ at any given time. Thus, in order to ensure that the appropriate amount of AV traffic is provided to the switch device for transmission over each of the channels, the AV stream processor may monitor the depths of the buffers of the AV stream processor that are associated with the ports over which the AV traffic is being transmitted. In one or more implementations, the AV stream processor may also monitor the depths of queues of the switch device that are associated with the ports. The AV stream processor may adaptively modify the amount of AV traffic provided to the switch device for transmission over any of the ports based at least on the monitored buffer depths, as is discussed further below with respect to FIG. 4.

In one or more implementations, the electronic device 107 may be disparately located from the gateway device 120. For example, the gateway device 120 may be located in a home of a user, while the user may travel with the electronic device 107 to a remote location, such as a hotel. The electronic device 107 may use channel bonding and/or ABR streaming to receive AV content from the gateway device 120, such as AV content corresponding to a movie or television program, and/or AV content corresponding to a videoconference being conducted with one of the electronic devices 102, 104, 106. For example, the electronic device 107 may receive chunks and/or segments of AV content from the gateway device 120 via a first channel over a cellular connection, such as a long term evolution (LTE) cellular connection, and via a second channel over a Wi-Fi connection, such as via a Wi-Fi connection provided by the hotel. In one or more implementations, the cellular connection may be provided by another device that is communicably coupled to the electronic device 107, such as a cellular phone that is tethered to the electronic device 107 via a local area connection, such as a Bluetooth connection.

In one or more implementations, one or more of the electronic devices 102, 104, 106, such as the electronic device 104, may use channel bonding and/or ABR streaming to receive AV content from the gateway device 120, such as AV content corresponding to a movie or television program, and/or AV content corresponding to a videoconference being conducted with, e.g., the electronic device 107. For example, the electronic device 104 may receive chunks and/or segments of AV content from the gateway device 120 via a first channel over a coaxial connection, such as a MoCA connection, and via a second channel over an Ethernet connection and/or Wi-Fi connection.

Figure 2:
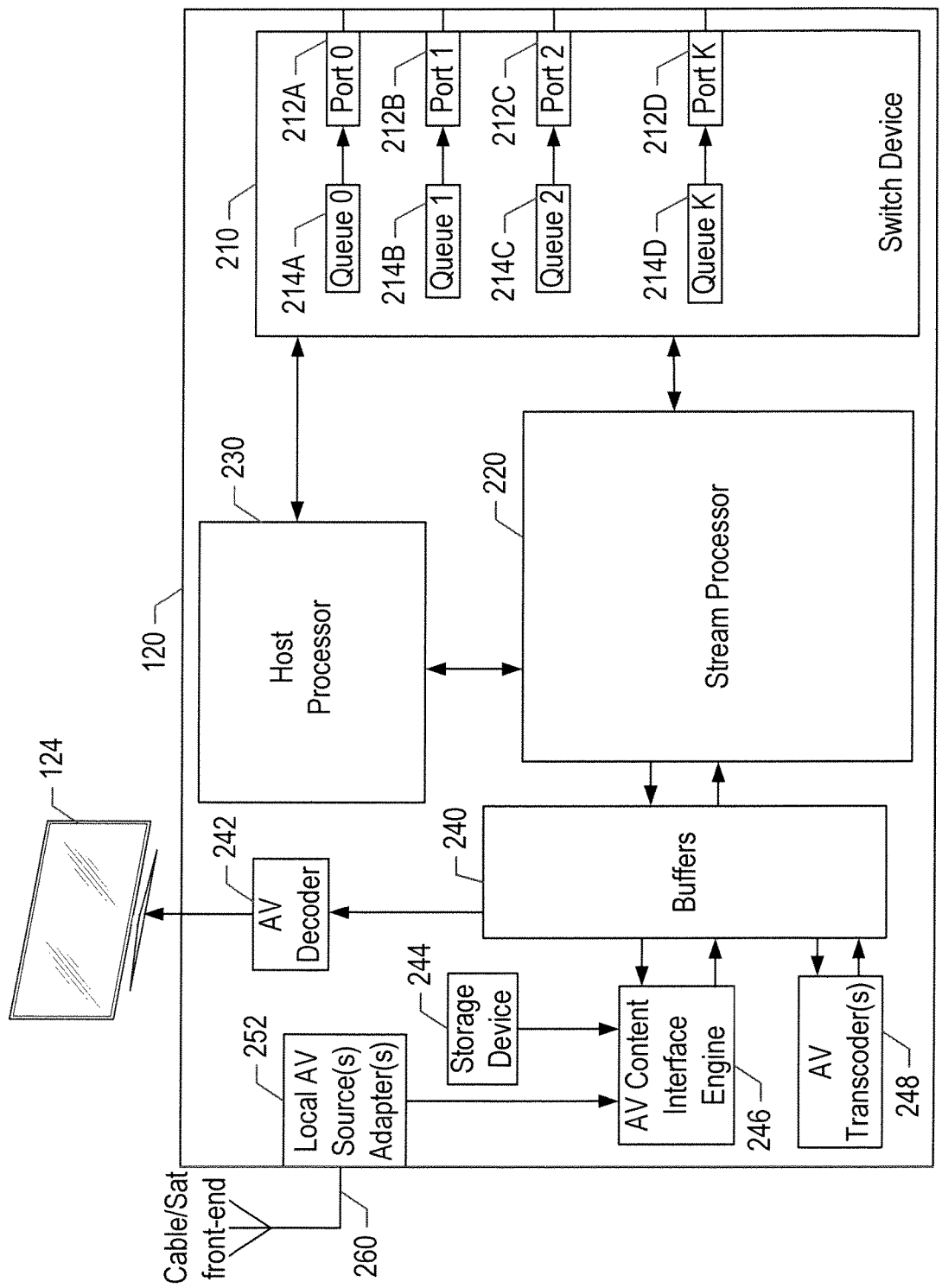
FIG. 2 illustrates an example gateway device implementing a system for adaptive AV stream processing in accordance with one or more implementations.

FIG. 2 illustrates an example gateway device 120 implementing a system for adaptive AV stream processing in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The gateway device 120 includes a switch device 210, an AV stream processor 220, a host processor 230, one or more buffers 240, an AV decoder 242, a storage device 244, an AV content interface engine 246, one or more AV transcoders 248, one or more local AV source adapters 252, and a cable/satellite front end 260. The cable/satellite front end 260 may include the satellite receiving device 122, and one or more other devices and/or connections for receiving AV content via a coaxial transmission network, via satellite, via antenna, and/or via any other transmission network. The switch device 210 may include one or more ports 212A-D that are associated with physical network interfaces and/or network connections, such as Ethernet, WiFi, multimedia over coax alliance (MoCA), reduced gigabit media independent interface (RGMII), etc. The ports 212A-D may be associated with queues 214A-D that each queue traffic, such as AV traffic, for transmission over the corresponding ports 212A-D.

The buffers 240 may be, or may include, one or more memory modules, such as dynamic random-access memory (DRAM), static random-access memory (SRAM), or generally any memory modules. For explanatory purposes, the buffers 240 are illustrated as a single block; however, the buffers 240 may be several separate individual buffers, or several separate partitions of one or more on-chip and/or off-chip memory modules. In one or more implementations, the buffers 240 may include one or more separately partitioned buffers associated with each of the ports 212A-D. The AV decoder 242 may be configured to retrieve transport stream packets from the buffers 240, decode the transport stream packets, and present the AV stream contained therein via the output device 124, e.g. via a local physical connection, such as a high-definition multimedia interface (HDMI) connection. The AV transcoders 248 may retrieve AV streams from the buffers 240, may transcode or otherwise encode the AV streams, e.g. for transmission to one or more of the electronic devices 102, 104, 106, and may store the transcoded AV streams in the buffers 240. The storage device 244 may be, or may include, a non-volatile storage medium, such as a hard drive, and may store one or more AV programs, such as AV programs received by the gateway device 120.

The local AV source adapters 252 may be one or more adapters configured to receive AV streams over one or more local AV connections, such as satellite, coaxial, etc. For example, the local AV source adapters 252 may include one or more tuners for receiving multiplexed bitstreams over satellite, coaxial, etc. The local AV source adapters 252 may also process received streams, such as demultiplexing multiplexed bitstreams, to access the individual AV streams and/or transport stream packets. The AV content interface engine 246 aggregates the received AV streams, e.g. transport stream packets received from the content server 112, from coaxial or satellite connections, e.g. via local AV source adapters 252, and/or stored on the storage device 244. The AV content interface engine 246 then stores the transport stream packets in the buffers 240 for transmission to the electronic devices 102, 104, 106, and/or for presentation via a local output device 124.

The AV stream processor 220 may include one or more processors, memory, such as dynamic random-access memory (DRAM), firmware, and one or more other modules and/or associated circuitry for processing AV traffic, such as a packetizer module, a depacketizer module, one or more security modules, and the like. The host processor 230 may be a general purpose processor of the gateway device 120. The host processor 230 and the AV stream processor 220 may be communicatively coupled to one another, for example, via a transmission line. The switch device 210 may include suitable circuitry and/or logic for routing network traffic, such as AV traffic and non-AV traffic, to one or more components of the gateway device 120, such as the host processor 230 and/or the AV stream processor 220.

In this regard, the host processor 230 and/or the AV stream processor 220 may individually be associated with a port on the switch device 210. For example, the AV stream processor 220 may be associated with a first port and the host processor 230 may be associated with a second port that is distinct from the first port. The switch device 210 may be configured to route communications received from, and/or transmitted to, an communicably connected device, such as one or more of the electronic devices 102, 104, 106 and/or the content server 112, to either port and consequently to either of AV stream processor 220 or host processor 230.

The AV stream processor 220 may monitor the depths of the buffers 240 associated with the ports 212A-D of the switch device 210. In one or more implementations, the AV stream processor 220 may also receive, from the switch device 210 or a module coupled thereto, an indication of the depths of the queues 214A-D. The AV stream processor 220 may utilize the buffer depth information, e.g., to discretely control bandwidth dependent services being provided over the ports 212A-D, such as adaptive bit rate streaming services, channel bonding services, videoconferencing services, etc.

In one or more implementations, the AV stream processor 220 may operate as an adaptive bit rate server. For example, the AV transcoder 248 may transcode an AV stream at a bit rate and the AV stream may be provided to the switch device 210 for transmission over one of the ports, such as the port 212A, to one or more of the electronic devices 102, 104, 106 such as the electronic device 104. The AV stream processor 220 may monitor the depth of the buffer 240 associated with the AV transcoder 248 and may determine, based on the depth, whether the bit rate of the transcoded AV stream should be decreased to prevent overflow of traffic at the buffer 240 and consequently at the port 212A, e.g. when the depth reaches an upper threshold, or increased to prevent underflow at the buffer 240 and consequently at the port 212A, e.g. when the depth reaches a lower threshold. The AV stream processor 220 may configure and/or instruct the AV transcoder 248 to transcode the AV stream at the adjusted bit rate.

In this manner, the AV stream processor 220 may rapidly adapt the bit rate of the AV stream, e.g. for latency sensitive video streaming services, such as videoconferencing, gaming, or any other service for which latency is critical, and/or to compensate for rapidly fluctuating network conditions, e.g. wireless network connections, as is discussed further below with respect to FIG. 3. The AV stream processor 220 may be able to adapt the bit rate more rapidly than adaptive bit rate streaming mechanisms that only allow for changes in bit rates at segment boundaries, where the segments may be 2-10 seconds in duration. However, in one or more implementations, the AV stream processor 220 may also perform one or more functions associated with an adaptive bit rate server, such as determining appropriate profiles for the AV stream, generating a manifest file to advertise the profiles, determining segment boundaries for segmenting the AV stream, etc.

In one or more implementations, the AV stream processor 220 may operate as an adaptive bit rate client and/or an adaptive bit rate server. For example, the AV stream processor 220 may receive an AV stream from the content server 112 via ABR streaming, may present the AV stream via the output device 124 and/or may provide the AV stream to one or more of the electronic devices 102, 104, 106 via ABR streaming. While receiving an AV stream via ABR streaming, the AV stream processor 220 may monitor a queue of the buffers 240 from which the AV stream processor 220 and/or the AV decoder 242 retrieve the AV stream, e.g. for presentation and/or for transmission to one or more of the electronic devices 102, 104, 106. The AV stream processor 220 may determine an appropriate bit rate of the AV stream to request from the content server 112 based at least on the depth of the queue of the buffers 240. For example, when the depth of the queue reaches an upper threshold, the AV stream processor 220 may request a lower bit rate from the content server 112, and when the depth of the queue reaches a lower threshold, the AV stream processor 220 may request a higher bit rate from the content server 112.

In one or more implementations, the AV stream processor may utilize channel bonding to transmit an AV stream to one of the electronic devices 102, 104, 106, such as the electronic device 104, over multiple physical interfaces of multiple ports 212A-D, such as the port 212A and the port 212B, at least partially contemporaneously. For example, the AV stream processor 220 may segment an AV stream into multiple ABR segments, e.g. aligned at group of picture (GOP) boundaries, and having a particular duration, such as ten seconds. The AV stream processor 220 may provide a first ABR segment to the switch device 210 for transmission to the electronic device 104 via the port 212A, and the AV stream processor 220 may provide a second sequential ABR segment to the switch device 210 for at least partially contemporaneous transmission to the electronic device 104 via the port 212B. Similarly, the AV stream processor 220 may separate the AV stream into chunks, e.g. portions of the video stream aligned at any packet boundary, and may provide a first number of chunks to the switch device 210 for transmission to the electronic device 104 via the port 212A, and a second number of chunks to the switch device 210 for transmission to the electronic device 104 via the port 212B. In one or more implementations, the AV stream processor 220 may segment an AV stream into multiple ABR segments, e.g. aligned at GOP boundaries, and may generate chunks from the ABR segments, where the chunks can be aligned at any boundary, e.g. the chunks may be aligned at boundaries other than the ABR segment boundaries.

In order to determine the number of ABR segments or chunks to transmit via each of the individual ports 212A-B, the AV stream processor 220 may monitor the depths of the buffers 240 associated with the ports 212A-D. In addition, the AV stream processor 220 may monitor the depth of the buffers 240 associated with the AV transcoder 248, e.g. an input queue associated with the AV transcoder 248 and/or an output queue associated with the AV transcoder 248, e.g. to determine the amount of the AV stream that is available for transmission, or will be available for transmission within a determinable amount of time, via the ports 212A-B. Thus, the AV stream processor 220 can discretely control the amount of AV traffic transmitted over each of the channel bonded ports 212A-B based at least on the depths of the queues of the switch device 210 and/or the depths of the queue associated with the AV transcoder 248, as is discussed further below with respect to FIG. 4.

In one or more implementations, the AV stream processor 220 may also implement a muxing logic and a packetization pipeline that may further reduce latency, e.g. for latency sensitive video streaming services, such as videoconferencing. For example, the muxing logic and packetization pipeline implemented by the AV stream processor 220 may reduce mux delay and/or networking stack delay, e.g. when providing AV streams for a videoconferencing system. Furthermore, if an AV stream processor 220 is implemented at both the client and server ends of a videoconferencing system, the latency improvement may be achieved at both ends and therefore may effectively be doubled.

Figure 3:
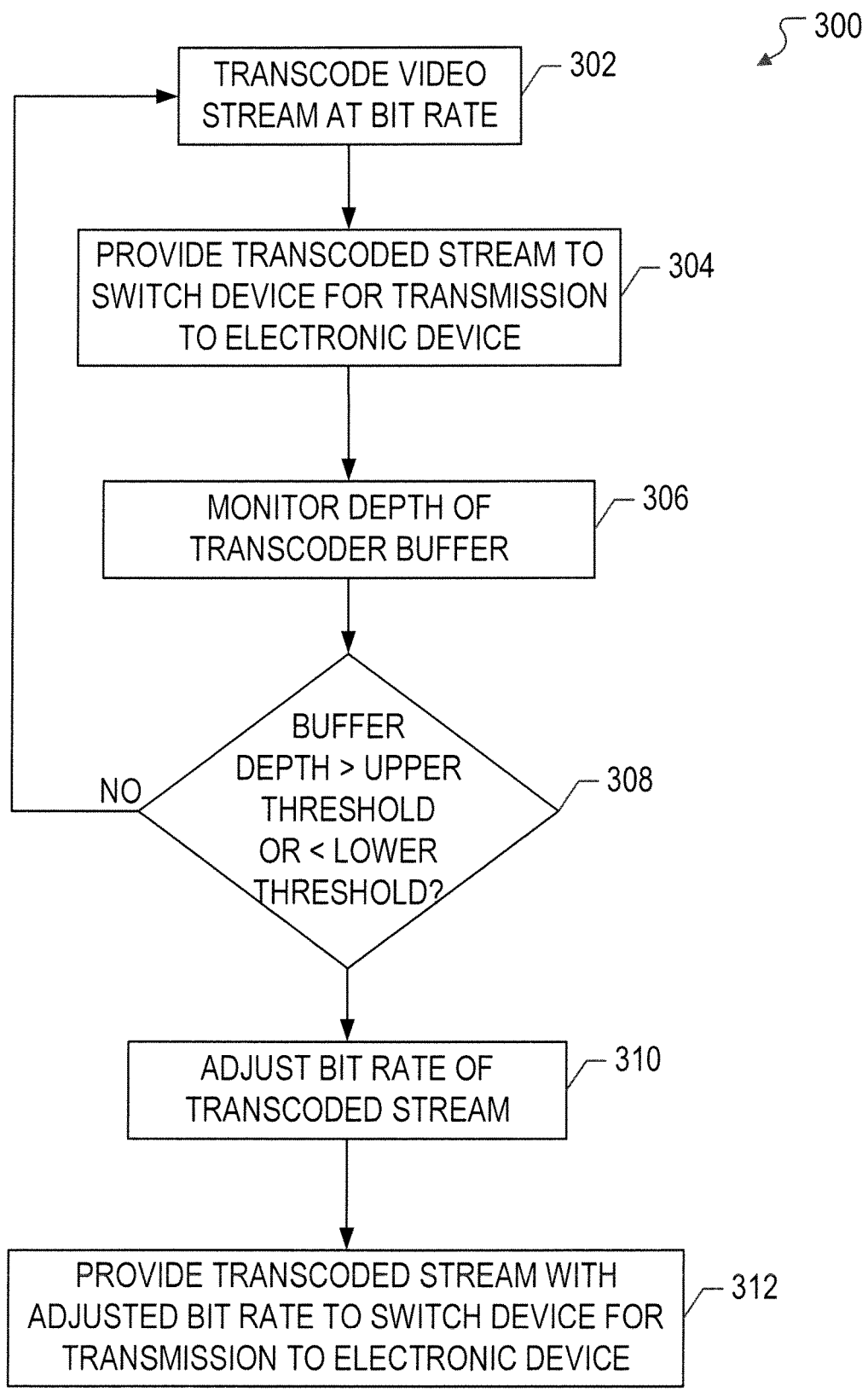
FIG. 3 illustrates a flow diagram of an example adaptive bit rate process of a system for adaptive AV stream processing in accordance with one or more implementations.

FIG. 3 illustrates a flow diagram of an example adaptive bit rate process 300 of a system for adaptive AV stream processing in accordance with one or more implementations. For explanatory purposes, the example process 300 is primarily described herein with reference to AV stream processor 220 of the gateway device 120 of FIG. 2; however, the example process 300 is not limited to the AV stream processor 220 of the gateway device 120 of FIG. 2, and the example process 300 may be performed by one or more other components of the gateway device 120. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

An AV transcoder 248 of the gateway device 120 transcodes an AV stream at a bit rate and stores the transcoded AV stream in a portion of the buffers 240, e.g. a transcoder buffer, for transmission to the switch device 210 (302). For example, an AV stream may be requested from the content server 112 by one of the electronic devices 102, 104, 106, such as the electronic device 104, and may be received by the AV stream processor 220 from the content server 112 at a particular bit rate. The AV stream processor 220 may determine that the particular bit rate is not appropriate for transmission to the electronic device 104, e.g. based at least on capabilities of the electronic device 104 and/or network conditions between the gateway device 120 and the electronic device 104. The AV stream processor 220 may configure the AV transcoder 248 to transcode the AV stream at the bit rate, e.g. for transmission to the electronic device 104 via one of the ports 212A-D of the switch device 210, such as the port 212A.

The AV stream processor 220 may process the transcoded AV stream, e.g. packetize, encrypt, etc., and may provide the transcoded AV stream to the switch device 210 for transmission to the electronic device 104 via the port 212A (304). The switch device 210 may queue the transcoded AV stream in the queue 214A and may subsequently transmit the transcoded AV stream to the electronic device 104 via the port 212A. However, if the switch device 210 receives the transcoded AV stream from the AV stream processor 220 at a rate that is faster than the switch device 210 can transmit the transcoded AV stream to the electronic device 104 over the port 212A, e.g. based at least on available bandwidth and/or network conditions of between the switch device 210 and the electronic device 104 over the port 212A, the queue 214A, and consequently the portion of the buffers 240 that stores the output of the AV transcoder 248, may begin to fill. Alternatively, if the switch device 210 transmits the transcoded AV stream to the electronic device 104 via the port 212A at a rate that is faster than the switch device 210 receives the transcoded AV stream from the AV stream processor 220, the queue 214A, and consequently the portion of the buffers 240 that stores the output of the AV transcoder 248, may begin to empty.

Thus, in conjunction with the transmission of the transcoded AV stream to the switch device 210, the AV stream processor 220 monitors the depth of the portion of the buffers 240 that stores the output of the AV transcoder 248 (306). In one or more implementations, the AV stream processor 220 may monitor a depth of the queue 214A associated with the port 212A over which the transcoded AV stream is being transmitted to the electronic device 104. For example, since the AV stream processor 220 and the switch device 210 are collocated, e.g. on the same printed circuit board (PCB), there may be a hard-wired transmission line on the PCB between the AV stream processor 220 and the switch device 210. The transmission line may be communicably coupled to the queues 214A-D and therefore may allow the AV stream processor 220 to monitor the depths of the queues. In one or more implementations, the switch device 210 may include a module that monitors the depths of the queues 214A-D and provides the queue depths to the AV stream processor 220, and/or a component in communication therewith, e.g. via a hard-wired transmission line. In one or more implementations, when determining the depth of the queue 214A, the AV stream processor 220 may account for packets of the transcoded AV stream that have been transmitted to the switch device 210, but are not yet stored in the queue 214A, e.g. in-flight packets.

The AV stream processor 220 may compare the depth of the transcoder buffer of the buffers 240 to one or more thresholds to determine whether the depth of the transcoder buffer is too low or too high (308). For example, the AV stream processor 220 may compare the depth of the transcoder buffer to an upper threshold to determine if the depth of the transcoder buffer is too high, and the AV stream processor 220 may compare the depth of the transcoder buffer to a lower threshold to determine if the depth of the transcoder buffer is too low. The upper threshold may be set to minimize the possibility of an overflow of the transcoder buffer, which may result in packet loss. The lower threshold may be set to minimize the possibility of underflow of the transcoder buffer, which may result, e.g. depending upon the buffer size at the electronic device 104, in disruption of the presentation of the AV stream by the electronic device 104.

If the AV stream processor 220 determines that the depth of the transcoder buffer is less than the upper threshold and greater than the lower threshold (308), the AV transcoder 248 may continue to transcode the AV stream at the bit rate (302). If the AV stream processor 220 determines that the depth of the transcoder buffer is greater than the upper threshold, or lower than the lower threshold (308), the AV stream processor 220 instructs the AV transcoder 248 to adjust the bit rate at which the AV stream is being transcoded (310), such as by adjusting one or more transcoding parameters associated with the AV transcoder 248.

For example, if the depth of the transcoder buffer is greater than the upper threshold, the AV stream processor 220 may configure the AV transcoder 248 to reduce the bit rate at which the AV stream is being transcoded. Alternatively, if the depth of the transcoder buffer is lower than the lower threshold, the AV stream processor 220 may configure the AV transcoder 248 to increase the bit rate at which the AV stream is being transcoded. The AV stream processor 220 then provides the transcoded AV stream at the adjusted bit rate to the switch device 210 for transmission to the electronic device 104 via the port 212A (312).

Since the AV stream processor 220 monitors the depth of the transcoder buffer in real-time, or near real-time, the AV stream processor 220 can rapidly adapt the bit rate at which the AV stream is being transcoded by the AV transcoder 248, e.g. to account for rapidly fluctuating network conditions. In this manner, the AV stream processor 220 can substantially ensure that the transcoder buffer will not incur overflow or underflow, thereby ensuring a continuous presentation of the AV stream at the electronic device 104. Furthermore, since the AV stream processor 220 can rapidly adapt the bit rate of the transcoded AV stream, e.g. based at least on fluctuating network conditions, the electronic device 104 may not need to buffer a large amount of the received AV stream. Thus, the amount of time required to initially buffer the AV stream by the electronic device 104 may be reduced.

Figure 4:
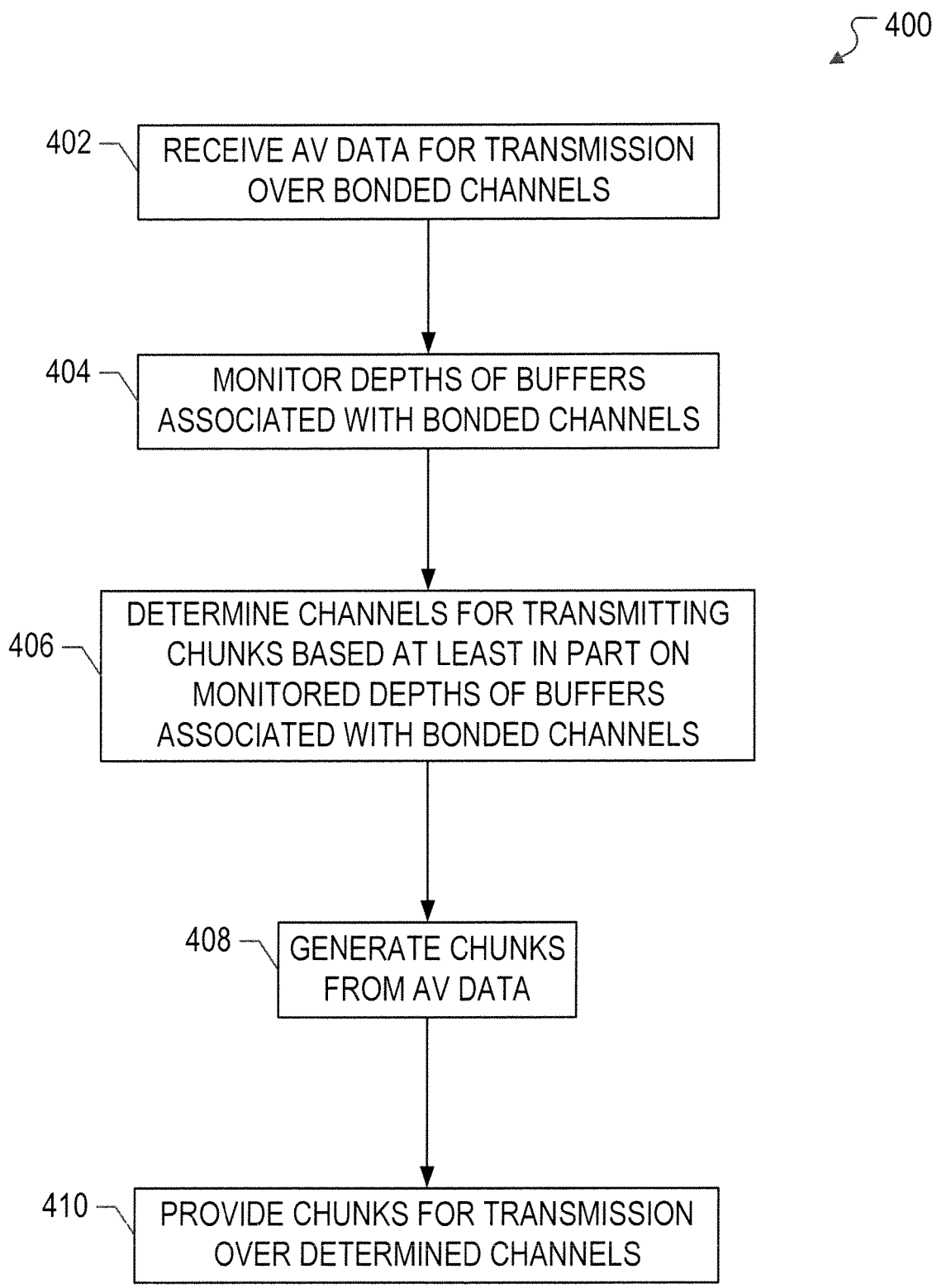
FIG. 4 illustrates a flow diagram of an example adaptive channel bonding process of a system for adaptive AV stream processing in accordance with one or more implementations.

FIG. 4 illustrates a flow diagram of an example adaptive channel bonding process 400 of a system for adaptive AV stream processing in accordance with one or more implementations. For explanatory purposes, the example process 400 is primarily described herein with reference to the AV stream processor 220 of the gateway device 120 of FIG. 2; however, the example process 400 is not limited to the AV stream processor 220 of the gateway device 120 of FIG. 2, and the example process 400 may be performed by one or more other components of the gateway device 120. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

The AV stream processor 220 receives AV data for transmission over multiple bonded channels (402). The AV data may be, or may include, one or more transport stream packets. For example, the AV stream processor 220 may receive the AV data from an AV transcoder 248, from the storage device 244, from the local AV source adapters 252, e.g. via a cable and/or satellite distribution network, or generally from any AV data source. In one or more implementations, the AV stream processor 220 may include individual buffers associated with each of the ports 212A-D (that are each associated with an networking interface, such as Ethernet, MoCa, WiFi, etc.) over which the AV data is being transmitted, and/or is to be transmitted, to an electronic device 104. The AV stream processor 220 may store the AV data in the separate buffers before the AV data is provided to the switch device 210, e.g. for transmission to the electronic device 104. In one or more implementations, the buffers may be on-chip, and/or the buffers may be a portion of the buffers 240. In one or more implementations, the AV stream processor 220 may segment the AV data into segments, such as ABR segments.

The AV stream processor 220 monitors the depths the individual buffers associated with each of the ports 212A-D over which the AV data is being transmitted, and/or is to be transmitted, to the electronic device 104 (404). The AV stream processor 220 determines, based on the depths of the individual buffers, channels for transmitting the received AV data, or portions thereof (406). For example, the AV stream processor 220 may identify one or more channels for which the depth of the associated buffers is low, or for which the associated buffers have memory space for at least a portion of the AV data. In one or more implementations, the AV stream processor 220 may distribute the AV data for transmission across the channels such that the depths of the associated buffers are approximately even, e.g. such that the buffers do not incur overflow or underflow.

The AV stream processor 220 generates chunks from the AV data (408). In one or more implementations, a chunk of the transcoded AV stream may refer to one or more packets of the AV stream. For example, the AV stream processor 220 may separate the AV stream into one or more chunks that are identified by marker information. The marker information may be inserted into the AV stream in the form of marker packets, or existing packets of the AV stream may be modified to include marker information. The chunks may be aligned at any packet boundary, e.g. the chunks may not necessarily be aligned at group of pictures (GOP) boundaries. The chunks may vary in size over time, e.g. based on the communication channel over which the chunks will be transmitted, the program content in the chunk, or based on any other decision factors.

The AV stream processor 220 provides the chunks for transmission over the determined channels (410). For example, the AV stream processor 220 may store the chunks in the buffers associated with the determined channels. The chunks may then be retrieved from the buffers and provided to the switch device 210 for transmission over the ports 212A-D associated with the determined channels. The AV stream processor 220 may continue to receive AV data (402) and process the AV data accordingly (404-410).

As previously discussed, the AV data from which the chunks are generated may be segmented into ABR segments. In one or more implementations, the AV stream processor 220 may determine a number of segments, e.g. ABR segments, to be transmitted to the electronic device 104 over the ports 212A-D associated with the determined channels, instead of generating chunks from the ABR segments. In one or more implementations, the ABR segments may differ from the chunks in that each ABR segment may be aligned at a GOP boundary. For example, the AV stream processor may provide alternating segments to the switch device 210 for transmission over ports associated with the determined channels, e.g. the first and second ports 212A-B. For example, the AV stream processor 220 may provide a first segment for transmission over the port 212A, e.g. by storing the segment in the appropriate buffer, and the second segment over the port 212B, e.g. by storing the segment in the appropriate buffer. In one or more implementations, if the available bandwidth over the ports 212A-B differs, the AV stream processor 220 may provide a number of segments for transmission over the ports 212A-B that is proportional to the bandwidth available over the ports 212A-B. For example, twice as much bandwidth is available over the port 212A as the port 212B, the AV stream processor may provide a first and second segment for transmission over the port 212A, a third segment for transmission over the port 212B, a fourth and fifth segment for transmission over the port 212A, etc.

Figure 5:
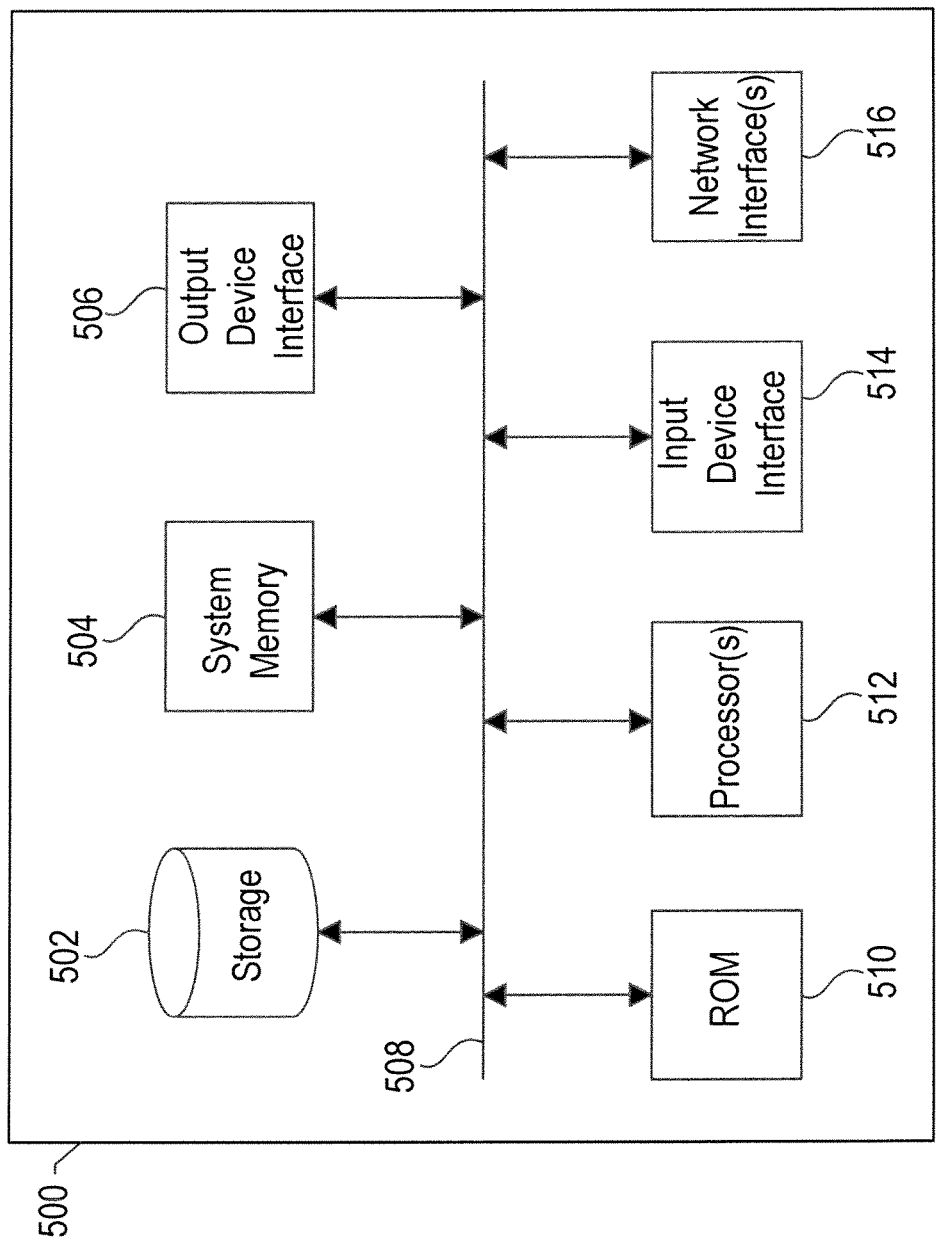
FIG. 5 conceptually illustrates an electronic system with which one or more implementations of the subject technology may be implemented.

FIG. 5 conceptually illustrates an electronic system 500 with which one or more implementations of the subject technology may be implemented. The electronic system 500, for example, can be a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 500 can be, and/or can be a part of, the gateway device 120, and/or one or more of the electronic devices 102, 104, 106. Such an electronic system includes various types of computer readable media and interfaces for various other types of computer readable media. The electronic system 500 includes a bus 508, one or more processor(s) 512, such as the AV stream processor 220 and/or the host processor 230, a system memory 504 or buffer, a read-only memory (ROM) 510, a permanent storage device 502, an input device interface 514, an output device interface 506, and one or more network interface(s) 516, or subsets and variations thereof.

The bus 508 collectively represents all system, peripheral, and chipset buses that communicatively connect the numerous internal devices of the electronic system 500. In one or more implementations, the bus 508 communicatively connects the one or more processor(s) 512 with the ROM 510, the system memory 504, and the permanent storage device 502. From these various memory units, the one or more processor(s) 512 retrieve instructions to execute and data to process in order to execute the processes of the subject disclosure. The one or more processor(s) 512 can be a single processor or a multi-core processor in different implementations.

The ROM 510 stores static data and instructions that are needed by the one or more processor(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processor(s) 512 may need at runtime. In one or more implementations, the processes of the subject disclosure are stored in the system memory 504, the permanent storage device 502, and/or the ROM 510. From these various memory units, the one or more processor(s) 512 retrieve instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 5, bus 508 also couples electronic system 500 to one or more networks (not shown), one or more electronic devices 102, 104, 106, and/or content server 112, through one or more network interface(s) 516. One or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 500 can be a part of one or more networks of computers (such as a local area network ("LAN"), a wide area network ("WAN"), or an Intranet, or a network of networks, such as the Internet. Any or all components of electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
at least one processor circuit configured to:
receive AV traffic comprising a video stream from a switch device;
separate the video stream into segments;
determine first buffer depth information for a first channel buffer that is associated with a first port of the switch device and second buffer depth information for a second channel buffer that is associated with a second port of the switch device;
determine a first portion of the segments to transmit to an electronic device over the first port of the switch device based at least on the first buffer depth information and a second portion of the segments to transmit to the electronic device over the second port of the switch device based at least on the second buffer depth information; and
provide the first portion of the segments to the switch device for transmission to the electronic device over the first port and the second portion of the segments to the switch device for transmission to the electronic device over the second port.

2. The device of claim 1, wherein the at least one processor circuit is further configured to:
determine boundaries of the segments irrespective of group of picture (GOP) boundaries of the video stream.

3. The device of claim 2, wherein the at least one processor circuit is further configured to:
insert marker information to indicate the boundaries of the segments.

4. The device of claim 1, wherein the at least one processor circuit is further configured to:
pass the video stream to a transcoder for transcoding;
buffer a transcoded video stream output by the transcoder in a transcoder buffer; and
separate the transcoded video stream of the transcoder buffer into the segments.

5. The device of claim 4, wherein the at least one processor circuit is further configured to:
determine the first portion of the segments to transmit to the electronic device over the first port of the switch device based at least on the first buffer depth information and an amount of the transcoded video stream stored in the transcoder buffer and the second portion of the segments to transmit to the electronic device over the second port of the switch device based at least on the second buffer depth information and the amount of the transcoded video stream stored in the transcoder buffer.

6. The device of claim 5, wherein the at least one processor circuit is further configured to adjust a bit rate of the transcoding based at least in part on the amount of the transcoded video stream stored in the transcoder buffer and at least one of the first buffer depth information or the second buffer depth information.

7. The device of claim 5, wherein the at least one processor circuit is further configured to:
adjust the first portion of the segments to transmit to the electronic device over the first port of the switch device based at least on a first change in the first buffer depth information or the amount of the transcoded video stream stored in the transcoder.

8. The device of claim 7, wherein the at least one processor circuit is further configured to:
adjust the second portion of the segments to transmit to the electronic device over the second port of the switch device based at least on a second change the second buffer depth information and the amount of the transcoded video stream stored in the transcoder buffer.

9. The device of claim 1, wherein non-AV traffic is routed by the switch device to another at least one processor circuit for processing.

10. The device of claim 9, wherein the device comprises the switch device and the another at least one processor circuit.

11. The device of claim 1, wherein the first port and the second port are channel bonded.

12. A method comprising:
receiving, by a first processor, AV traffic comprising a video stream from a collocated switch device;
determining first buffer depth information for a first channel buffer that is associated with a first port of the switch device and second buffer depth information for a second channel buffer that is associated with a second port of the switch device;
determining a first portion of the video stream to transmit to an electronic device over the first port of the switch device based at least on the first buffer depth information and a second portion of the video stream to transmit to the electronic device over the second port of the switch device based at least on the second buffer depth information; and
providing the first portion of the video stream to the switch device for transmission to the electronic device over the first port and the second portion of the video stream to the switch device for transmission to the electronic device over the second port.

13. The method of claim 12, wherein non-AV traffic is routed by the switch device to a second processor for processing, the second processor being collocated in a device with the first processor and the switch device.

14. The method of claim 12, further comprising:
transcoding, by a transcoder, the video stream; and
buffering a transcoded video stream output by the transcoder in a transcoder buffer.

15. The method of claim 14, wherein determining the first portion of the video stream to transmit to the electronic device over the first port of the switch device based at least on the first buffer depth information and the second portion of the video stream to transmit to the electronic device over the second port of the switch device based at least on the second buffer depth information further comprises:
determining the first portion of the video stream to transmit to the electronic device over the first port of the switch device based at least on the first buffer depth information and an amount of the transcoded video stream stored in the transcoder buffer and the second portion of the video stream to transmit to the electronic device over the second port of the switch device based at least on the second buffer depth information and the amount of the transcoded video stream stored in the transcoder buffer.

16. A computer program product comprising instructions stored in a non-transitory computer-readable storage medium, the instructions comprising:
   instructions to separate a video stream into segments;
   instructions to determine first buffer depth information for a first channel buffer that is associated with a first port of a switch device and second buffer depth information for a second channel buffer that is associated with a second port of the switch device;
   instructions to determine a first portion of the segments to transmit to an electronic device over the first port of the switch device based at least on the first buffer depth information and a second portion of the segments to transmit to the electronic device over the second port of the switch device based at least on the second buffer depth information; and
   instructions to provide the first portion of the segments to the switch device for transmission to the electronic device over the first port and the second portion of the segments to the switch device for transmission to the electronic device over the second port.

17. The computer program product of claim 16, the instructions further comprising:
   instructions to determine boundaries of the segments irrespective of group of picture (GOP) boundaries of the video stream.

18. The computer program product of claim 17, wherein the instructions for separating the video stream into segments comprise:
   instructions to insert marker information to indicate the boundaries of the segments.

19. The computer program product of claim 16, the instructions further comprising:
   instructions to pass the video stream to a transcoder for transcoding;
   instructions to buffer a transcoded video stream output by the transcoder in a transcoder buffer; and
   instructions to separate the transcoded video stream of the transcoder buffer into the segments.

20. The computer program product of claim 19, wherein the instructions to determine the first portion of the segments to transmit to the electronic device over the first port of the switch device based at least on the first buffer depth information and the second portion of the segments to transmit to the electronic device over the second port of the switch device based at least on the second buffer depth information further comprises:
   instructions to determine the first portion of the segments to transmit to the electronic device over the first port of the switch device based at least on the first buffer depth information and an amount of the transcoded video stream stored in the transcoder buffer and the second portion of the segments to transmit to the electronic device over the second port of the switch device based at least on the second buffer depth information and the amount of the transcoded video stream stored in the transcoder buffer.

* * * * *